(12) United States Patent
Winarski et al.

(10) Patent No.: US 10,741,200 B1
(45) Date of Patent: Aug. 11, 2020

(54) DATA STORAGE IN VIEW OF SUSCEPTIBLE ZONES

(71) Applicant: International Business Machines Corporation, Armonk, NY (US)

(72) Inventors: Daniel James Winarski, Tucson, AZ (US); Lee Curtis Randall, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/452,701

(22) Filed: Jun. 26, 2019

(51) Int. Cl.
*G11B 15/43* (2006.01)
*G11B 5/008* (2006.01)

(52) U.S. Cl.
CPC .............. *G11B 5/00813* (2013.01)

(58) Field of Classification Search
CPC ....... G11B 5/008; G11B 5/00813; G11B 5/02; G11B 15/02; G11B 15/04; G11B 15/05; G11B 15/087; G11B 15/093; G11B 33/13; G11B 15/43; G11B 33/1406; G11B 33/1446
USPC ........ 360/31, 53, 55, 60, 61, 62, 63, 69, 48, 360/77.01, 77, 12, 73.04, 74.3
See application file for complete search history.

(56) References Cited

U.S. PATENT DOCUMENTS

| | | | |
|---|---|---|---|
| 6,021,017 A | 2/2000 | Asamura et al. | |
| 6,226,441 B1 | 5/2001 | Hartung et al. | |
| 6,898,036 B2 | 5/2005 | Gill et al. | |
| 6,999,269 B2 | 2/2006 | Johnson et al. | |
| 7,538,969 B2 | 5/2009 | Weber et al. | |
| 7,595,950 B2 | 9/2009 | Olson et al. | |
| 7,898,758 B2* | 3/2011 | Leopold, Jr. ........... | G11B 15/20 360/53 |
| 8,477,446 B2 | 7/2013 | Hutchon et al. | |
| 9,251,826 B1 | 2/2016 | Bayang et al. | |
| 10,068,599 B2* | 9/2018 | Bui ....................... | G11B 5/584 |
| 10,242,709 B1* | 3/2019 | Yamamoto ........... | G11B 20/182 |
| 2008/0266699 A1* | 10/2008 | Masuda ................. | G11B 5/584 360/69 |

OTHER PUBLICATIONS

Connolly et al., "Stress Analysis of Wound Magnetic Tape," American Society of Lubrication Engineers, ASLE Special Publication SP-16, Tribology and Mechanics of Magnetic Storage Systems, Printed Jan. 18, 2019, 12 pages.
Winarski et al., "Data Storage in View of Susceptible Zones," U.S. Appl. No. 16/452,669, filed Sep. 26, 2019.
List of IBM Patents or Patent Applications Treated as Related, Dated Jun. 20, 2019, 2 pages.

* cited by examiner

*Primary Examiner* — Nabil Z Hindi
(74) *Attorney, Agent, or Firm* — Jamar K. Ray

(57) ABSTRACT

A computer-implemented method may include obtaining position information of a susceptible zone of a tape. The susceptible zone may be a section of the tape where a stress value of the tape exceeds a threshold. The method may further include storing, based on the position information, a block of data to the tape in a first storage zone. The first storage zone may be positioned outside of the susceptible zone.

11 Claims, 6 Drawing Sheets

DATA STORAGE IN VIEW OF SUSCEPTIBLE ZONES

BACKGROUND

The present disclosure relates to data storage, and more specifically, to data storage onto tape media.

Tape media may be used for data storage. During its use and physical storage, tape media may be subject to one or more forces, such as stress and tension.

SUMMARY

Some embodiments of the present disclosure can be illustrated as a computer-implemented method. The method may include obtaining position information of a susceptible zone of a tape. The susceptible zone may be a section of the tape where a stress value of the tape exceeds a threshold. The method may further include storing, based on the position information, a block of data to the tape in a first storage zone. The first storage zone may be positioned outside of the susceptible zone.

A system and a computer program product corresponding to the above computer-implemented method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
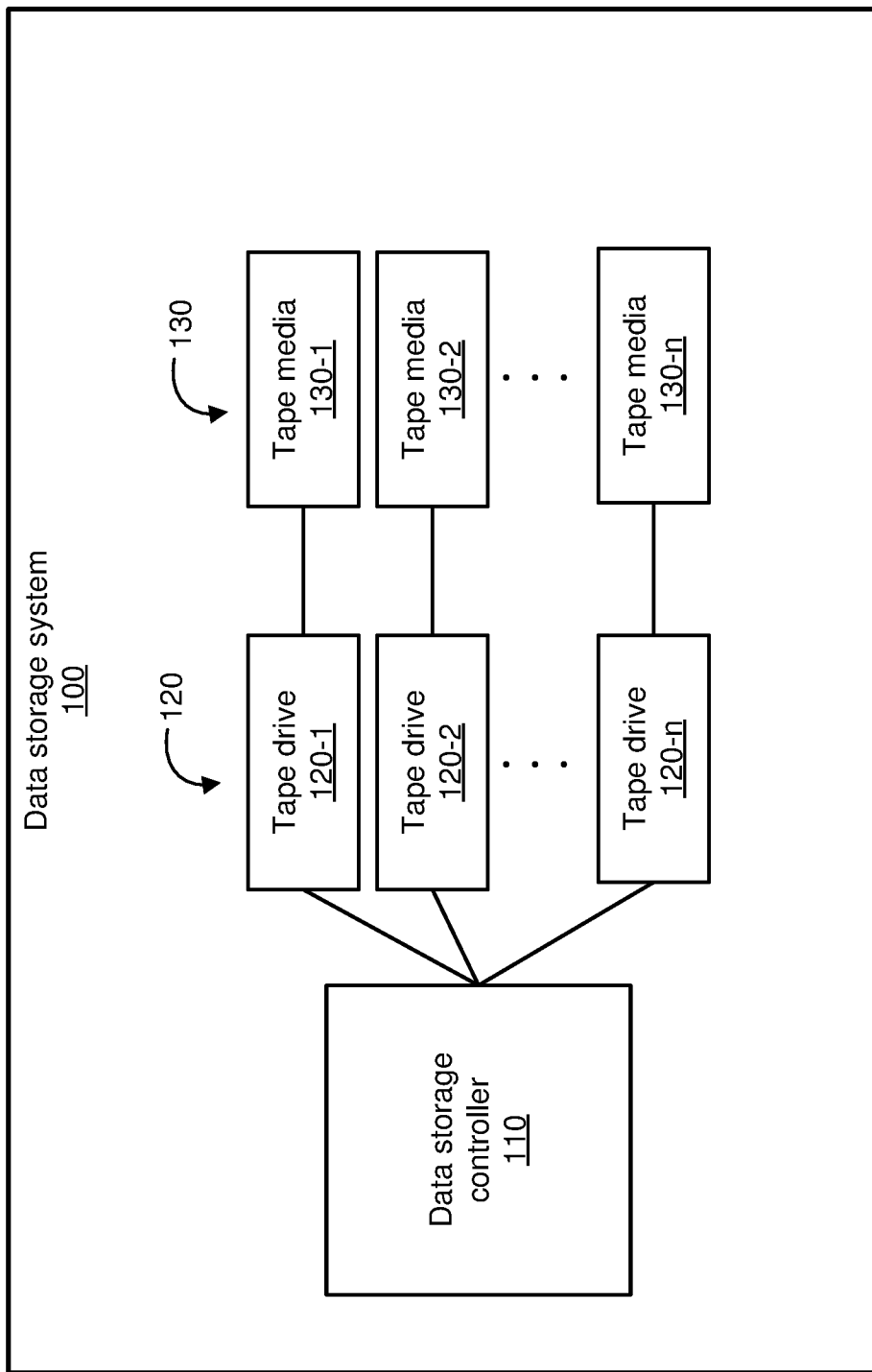
FIG. 1 depicts a system block diagram of a data storage system, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to tape media storage; more particular aspects relate to data storage in view of forces that may adversely affect tape media. While the present disclosure is not necessarily limited to such applications, various aspects of the disclosure may be appreciated through a discussion of various examples using this context.

Storage media, such as tape storage media, may experience physical damage as a result of forces exerted on the media. In particular, magnetic tape storage media may be subject to forces such as tension and compressive stress due to the tape being wound onto a hub. Such forces may reach maximum values in predetermined sections of the tape, based on factors such as the tape reel-hub geometry, tape thickness and width, tape winding tension, number of wraps of tape on the reel, chemistry of the tape front coat and substrate, humidity, and temperature. The forces may also cause the tape to creep, or deform, which may impair the ability to read data from the tape and/or write data to the tape.

To address these and other problems, embodiments of the present disclosure include a process and system for managing the storage of data onto portions of tape media that may be less susceptible to physical damage. In some embodiments of the present disclosure, a system may obtain information about portions of the tape media that may be subject to forces that may damage the data stored on those portions (hereinafter referred to as "susceptible zones"). In some embodiments, the system may store a block of data outside of such susceptible zones to improve the likelihood that the block of data may not be damaged as a result of forces applied to the tape media. In some embodiments, the system may additionally obtain information regarding where and how a first block of data was stored onto tape media. Based on the obtained information about the susceptible zones and the first block of data, the system may store a duplicate block of data in at least one of a different storage location and a different data sequence than the storage location and the data sequence of the first block of data. In this way, the system may improve the likelihood that a tape media storage location for a backup copy of a first block of data may not experience the same forces that may apply to a tape media storage location for the first block of data. Accordingly, embodiments of the present disclosure may store data to tape media in such a way that the data may be recoverable despite susceptible zones on the tape media.

Turning to the figures, FIG. 1 illustrates a data storage system 100 according to an embodiment of the present disclosure. The data storage system 100 may include a data storage controller 110, one or more tape drives 120, and one or more tape media 130. In some embodiments, the data storage controller 110 may include a computer system, such as computer system 601 described with respect to FIG. 6. The data storage controller 110 may include a processor configured to perform one or more process steps for storing data to tape media, such as the process steps disclosed in FIG. 2. The data storage system 100 may include one or more tape drives 120 configured to receive one or more commands from data storage controller 110 and to store data to tape media 130. For example, in some embodiments, tape drive 120-1 may receive a command from data storage controller 110 to store a block of data to tape media 130-1, and tape drive 120-2 may receive a command from data storage controller 110 to store a duplicate block of data to tape media 130-2. In some embodiments, tape media 130 may include magnetic tape contained in a cartridge. Tape media 130 may include one or more data tracks and one or more data bands for storing data, as well as one or more servo tracks used for precisely aligning a tape I/O head relative to the data tracks.

Figure 2:
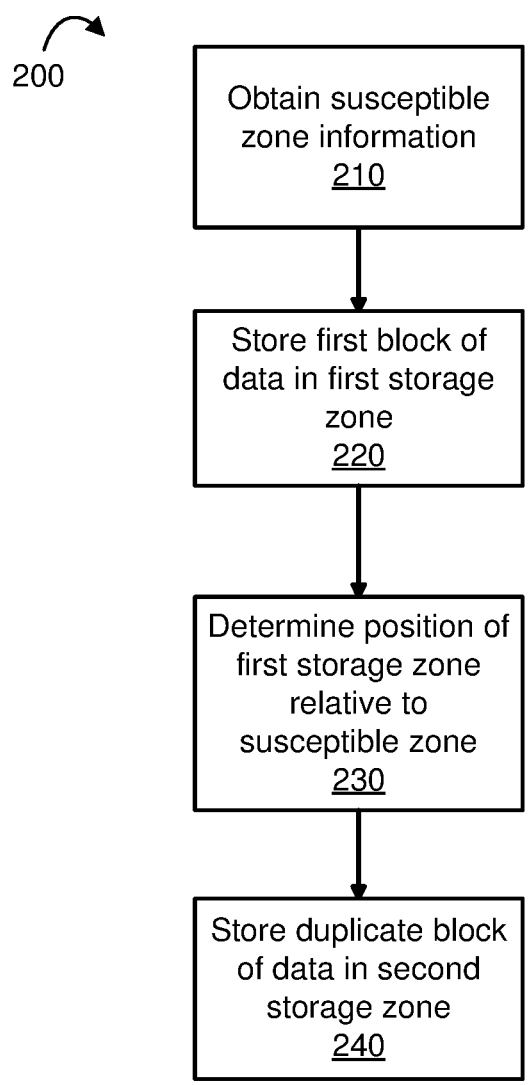
FIG. 2 depicts a flowchart of an example process for storing data onto tape media, in accordance with embodiments of the present disclosure.

FIG. 2 is a flow diagram illustrating a process 200 for storing duplicate data onto tape media, according to an illustrative embodiment of the present disclosure. The process 200 may be performed by a computer system, such as computer system 601 described with respect to FIG. 6.

Referring back to FIG. 2, in step 210, a computer system according to an embodiment of the present disclosure may obtain information regarding a set of susceptible zones of the tape media to which data is to be stored. A susceptible zone may be a section or segment of tape media that is subject to a higher magnitude of force (e.g., stress, tension) relative to one or more other sections or segments of the tape media. For example, in some embodiments, when tape media is wound onto a center hub, a maximum compressive stress may be determined to occur in a segment of the tape media that is located approximately one-third of the radial distance from the center of the hub to the outermost surface of the winding (i.e., one-third the distance of the radius of the winding). In some embodiments, a magnitude of stress and/or tension in the tape media may be determined to be greater in segments proximate the lateral edges of the tape media than in segments proximate the center of the tape media (e.g., a stress in length of a 12.7 mm-wide tape media may be determined to be greater in segments of the tape media that are approximately within 1 mm of the lateral edges of the tape media than in segments of the tape that are approximately within the middle 10.7 mm width of the tape media).

In some embodiments, a susceptible zone may be determined by a magnitude of force that exceeds a threshold. For example, in some embodiments, a susceptible zone may be determined based on a segment of the tape media being subject to a stress that exceeds a predetermined stress value, for example, 1-10 MPa. In some embodiments, a susceptible zone may be determined based on a segment of the tape media being subject to a force that may result in a tape media deformation that exceeds a predetermined deformation value, such as a 0.01%-0.10% elongation. In some embodiments, a susceptible zone may be determined based on a segment of the tape media being subject to a force that causes a deformation of the tape media, which deformation causes misalignment between the tape media and a tape head in the range of approximately 50 nm to approximately 100 nm. In some embodiments, a susceptible zone may be determined based on a segment of the tape media being subject to a stress that exceeds by a predetermined percentage a stress experienced by another segment of the tape media (e.g., a segment of tape media along the outer width of the tape media may be subject to approximately 1%-5% greater stress than a segment of tape media proximate the center width of the tape).

In some embodiments, the obtained susceptible zone information may include information about where a susceptible zone is positioned along the length of the tape media (i.e., longitudinal position information) and/or information about where a susceptible zone is positioned across the width of the tape media (i.e., transverse position information). For example, longitudinal position information of a susceptible zone may indicate that a susceptible zone extends between a distance that is 700 m from the beginning of the tape media to a distance that is 800 m from the beginning of the tape media. In another example, transverse position information may indicate that a susceptible zone is present in data bands 1 and 4, where data bands 1 and 4 are the outermost data bands across the width of the tape media.

Following obtaining the susceptible zone information, process 200 proceeds to store a first block of data in a first storage zone. This is illustrated at step 220, where a computer system according to an embodiment of the present disclosure may issue a command to store a block of data in a first storage zone. A storage zone may be a data storage location within one or more tracks and within one or more data bands of the tape media. For example, in some embodiments, the tape media may include 6656 tracks that extend along the length of the tape media and that are grouped into four data bands across the width of the tape media, each data band having 1664 tracks. In this example, a storage zone may be a storage location having a transverse position in the $100^{th}$ track of the first data band. Additionally, the storage zone may have a longitudinal position that extends from 50 m from the beginning of the tape media to 800 m from the beginning of the tape media. Storage zone information may include the longitudinal position and/or the transverse position of a storage zone.

In some embodiments, a block of data may include a file such as a document or a video. The block of data may be divided into segments that are stored onto the tape media in a predetermined data sequence. For example, in some embodiments, a block of data may be divided into four segments (S1, S2, S3, and S4) that may be stored onto the tape media in a first data sequence: S1, S2, S3, S4, or in a second data sequence: S4, S3, S2, S1. However, data may be divided into more segments or fewer segments.

In some embodiments, a computer system according to an embodiment of the present disclosure may store, based on the obtained susceptible zone information, a first block of data in a first storage zone that is positioned outside of a susceptible zone. In this way, the computer system may improve the likelihood that the first block of data may not be damaged as a result of forces applied to the tape media in a susceptible zone. In some embodiments, the computer system may store the first block of data in a first storage zone that is positioned beyond a minimum threshold distance from the susceptible zone. In this way, the computer system may account for potential fluctuations in the susceptible zone due to changed factors, such as winding tension or temperature.

In some embodiments, step 220 may include a computer system storing first storage zone information. In some embodiments, step 220 may not be necessary, as the computer system may obtain first storage zone information regarding a first block of data that was previously stored.

Following storing a first block of data in a first storage zone and/or obtaining first storage zone information regarding the first block of data, process 200 proceeds to step 230, where a computer system according to an embodiment of the present disclosure may determine a position of the first storage zone relative to a position of the susceptible zone. In some embodiments, step 230 may include a computer system comparing susceptible zone information to first storage zone information. For example, in some embodiments, susceptible zone information may indicate that susceptible zones extend along the entire length of both sides of the tape media and within 1 mm of the lateral edges of the tape media. Continuing with this example, first storage zone information may indicate that a first storage zone has a transverse position in the fifth track of a first data band. Based on the tape media specifications, the computer system may determine that the fifth track of the first data band is within 1 mm of a lateral edge of the tape media; thus, the first storage zone is within a susceptible zone.

Following determining a position of the first storage zone relative to the susceptible zone, process 200 proceeds to step 240, where a computer system according to an embodiment of the present disclosure may store a duplicate block of data in a second storage zone. In some embodiments, the first block of data and duplicate block of data may include identical or substantially similar content (e.g., the first block of data and the duplicate block of data may include the same document or video). The storage of the duplicate block of data in a second storage zone may be based on at least one of the first storage zone information and the susceptible zone information. In this way, the duplicate block of data may be stored differently (e.g., in a different position on the tape media and/or in a different data sequence on the tape media) when it is stored in the second storage zone. By storing the duplicate block of data differently when it is stored in the second storage zone, embodiments of the present disclosure may duplicate data without duplicating the potential damage to the data that may be caused by forces applied to the tape media.

For example, in some embodiments, if the first storage zone having a first block of data is within a susceptible zone, then the second storage zone having a duplicate block of data may be positioned outside of a susceptible zone. Such a different storage position may prevent the duplicate block of data stored in the second storage zone from experiencing the relatively higher forces that may be present in the susceptible zones. In some embodiments, if the first storage zone includes a block of data stored in a first data sequence, the second storage zone may include the duplicate block of data stored in a second data sequence that is a reordered first data sequence. Such a different storage sequence may prevent corresponding data segments (e.g., a segment S1 in a first storage zone and a duplicate segment S1 in a second storage zone) from experiencing substantially similar forces that may be applied to the tape media.

In another example, in some embodiments, a first block of data may be stored in a first storage zone that is positioned outside of a susceptible zone. The computer system may determine a longitudinal and/or transverse distance between the first storage zone and the susceptible zone. The computer system may store such distances as first storage zone information. Based on the first storage zone information, the computer system may store a duplicate block data in a second storage zone that has a greater longitudinal and/or transverse distance from a susceptible zone than the first storage zone does. For example, in some embodiments, a first storage zone may have a first longitudinal distance of 10 m from a susceptible zone. The computer system may determine that such distance exceeds a minimum threshold distance of 100 m. Based on the determination, the computer system may store a duplicate block of data in a second storage zone, such that the longitudinal distance between the second storage zone and the susceptible zone is greater than 100 m. By storing a duplicate block of data at a greater distance from a susceptible zone than a first block of data is positioned from a susceptible zone, embodiments of the present disclosure may account for error in the susceptible zone information (e.g., a susceptible zone that may extend farther than indicated in the susceptible zone information, due to a temperature or humidity fluctuation). In some embodiments, such storing of a duplicate block of data according to a threshold distance may be used when the first storage zone and the second storage zone are positioned on the same tape media. In some embodiments, such storing of a duplicate block of data according to a threshold distance may be used when the first storage zone is positioned on a first tape media and the second storage zone is positioned on a second tape media (e.g., the computer system determines that a first storage zone having a first block of data is positioned within 10 m of a susceptible zone on a first tape media, and based on that determination, the computer system stores a duplicate block of data to a second tape media in a second storage zone, the second storage zone positioned at a distance that is greater than a 100 m threshold distance from a susceptible zone that is on the second tape media).

Figure 3:
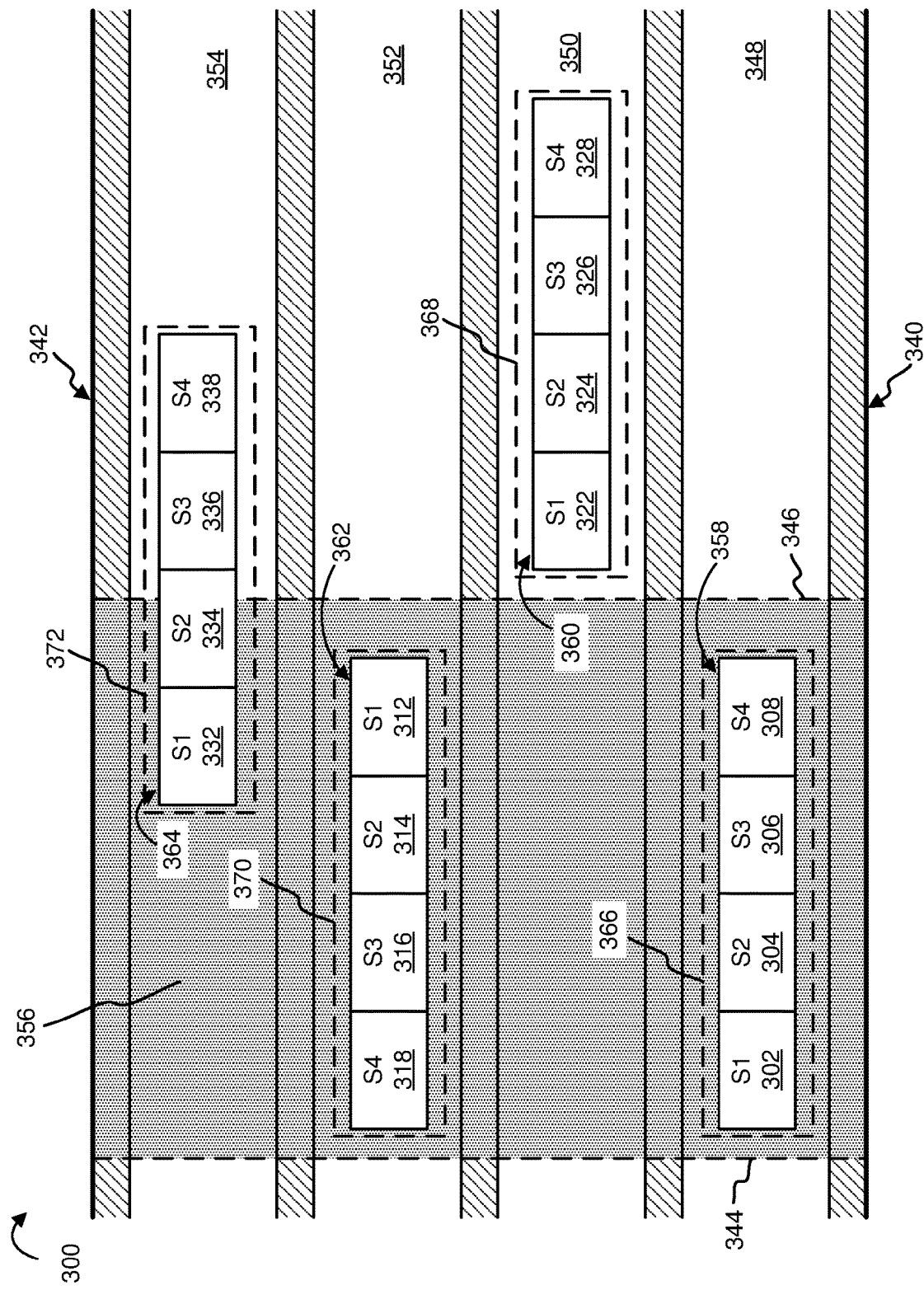
FIG. 3 depicts an example section of tape media having a susceptible zone, in accordance with embodiments of the present disclosure.

FIG. 3 illustrates an example section of tape media 300 having a susceptible zone 356, according to an embodiment of the present disclosure. The susceptible zone 356 extends in a longitudinal direction between a beginning longitudinal position 344 and an ending longitudinal position 346. The susceptible zone 356 also extends in a transverse direction between a first lateral edge 340 and a second lateral edge 342. Although tape media may contain thousands of tracks, for simplicity, tape media 300 is illustrated as having four tracks: track one 348, track two 350, track three 352, and track four 354.

In some embodiments of the present disclosure, a block of data 358 may be stored in four adjacent segments (S1 302, S2 304, S3 306, and S4 308) in a first storage zone 366. The first storage zone 366 may be positioned in track one 348 of tape media 300. Additionally, the first storage zone 366 may be stored within susceptible zone 356.

A computer system according to an embodiment of the present disclosure may determine that first storage zone 366 is within susceptible zone 356, based on obtained susceptible zone information corresponding to susceptible zone 356 and first storage zone information corresponding to first storage zone 366. Additionally, the obtained first storage zone information may indicate to the computer system that the block of data 358 is stored in the data sequence S1, S2, S3, S4. Based at least in part on the susceptible zone information and the first storage zone information, the computer system may store a duplicate block of data in a variety of configurations, such as the configurations described below regarding the second storage zone 368, the third storage zone 370, and the fourth storage zone 372.

For example, in some embodiments, the computer system may store a first duplicate block of data 360 in a second storage zone 368 that may be positioned in track two 350 of the tape media 300. Additionally, the second storage zone 368 may be positioned outside of the susceptible zone 356. In this way, duplicate segments S1 322, S2 324, S3 326, and S4 328, may not be exposed to the same forces that may be applied to the tape media 300 in the first storage zone 366.

In another example, in some embodiments, the computer system may store a second duplicate block of data 362 in a third storage zone 370 that may be positioned in track three 352 of the tape media 300. The third storage zone 370 may be positioned within the susceptible zone 356. In some embodiments, such positioning of the third storage zone 370 within the susceptible zone 356 may be based at least in part on factors such as a limited storage capacity of the tape media, limited available storage positions on the tape media, and a limited available time for performing data storage. However, the computer system may store the duplicate segments S1 312, S2 314, S3 316, and S4 318 in a different data sequence (i.e., S4, S3, S2, S1) than the block of data 358 is stored. Storing the second duplicate block of data 362 in a different data sequence may prevent each of the duplicate segments S1 312, S2 314, S3 316, and S4 318 from experiencing substantially similar forces to the forces experienced by corresponding segments S1 302, S2 304, S3 306, and S4 308. For example, in some embodiments, a compressive stress may cause a deformation in the tape media 300 where segments S1 302 and S4 318 are stored. Such deformation may cause segments S1 302 and S4 318 to become unreadable by a tape drive. However, because duplicate segment S1 312 is stored in a different longitudinal position on the tape media 300, duplicate segment S1 312 may not be exposed to a deformation in the tape that causes it to become unreadable by a tape drive. Accordingly, in this example, the block of data may be recovered by obtaining segment S1 312 from the third storage zone 370 and obtaining segments S2 304, S3 306, and S4 308 from the first storage zone 366.

In another example, in some embodiments, the computer system may store a third duplicate block of data 364 in a fourth storage zone 372 that may be positioned in track four 354 of the tape media 300. The fourth storage zone 372 may be positioned partially within the susceptible zone 356 and partially outside the susceptible zone; thus, duplicate segments S1 332 and S2 334 may contact the susceptible zone 356, and duplicate segments S3 336, and S4 338 may not contact the susceptible zone 356. In some embodiments, such positioning of the fourth storage zone 372 partially within the susceptible zone 356 may be based at least in part on factors such as a limited storage capacity of the tape media, limited available storage positions on the tape media, and a limited available time for performing data storage. In this example, if segments S3 306 and S4 308 are damaged due to a force such as an excessive tension on the tape media 300, the block of data may be recovered by obtaining segments S1 302 and S2 304 from the first storage zone 366 and obtaining segments S3 336 and S4 338 from the fourth storage zone 372.

Figure 4:
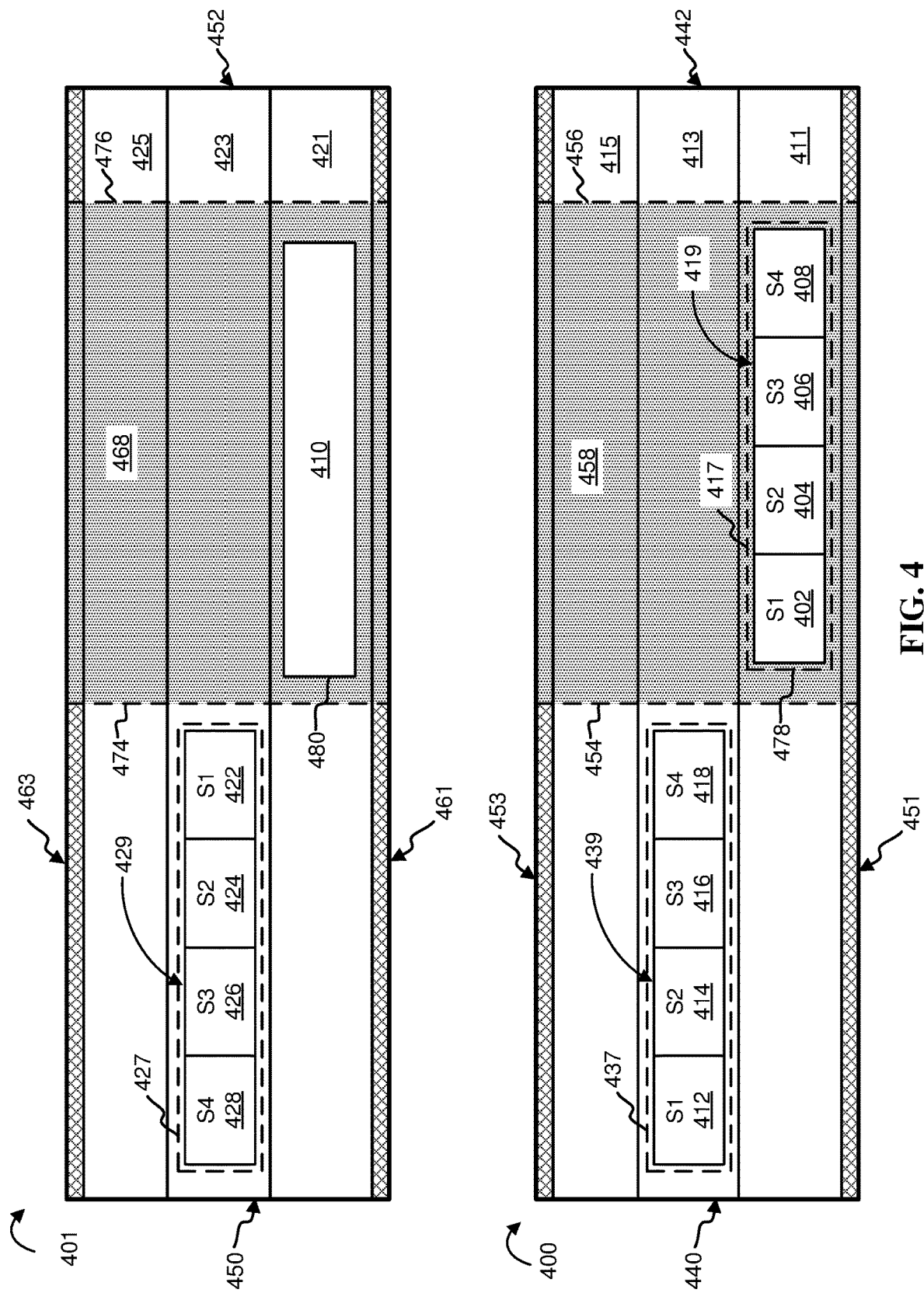
FIG. 4 depicts two example lengths of tape media having corresponding susceptible zones, in accordance with embodiments of the present disclosure.

FIG. 4 illustrates a first tape media 400 and a second tape media 401, in accordance with embodiments of the present disclosure. In some embodiments, the second tape media 401 may include a backup copy of the data stored on the first tape media 400. For simplicity, first tape media 400 is illustrated as having three tracks: track one 411, track two 413, and track three 415, between a first lateral edge 451 and a second lateral edge 453. Also, second tape media 401 is illustrated as having three tracks: track one 421, track 2 423, and track three 425, between a first lateral edge 461 and a second lateral edge 463. Similar to the embodiments described regarding FIGS. 2 and 3, a computer system according to an embodiment of the present disclosure may use susceptible zone information and storage zone information to store a duplicate block of data in a variety of configurations on at least one of the first tape media 400 and the second tape media 401.

The first tape media 400 may have a first beginning of tape media 440 and a first end of tape media 442, and the second tape media 401 may have a second beginning of tape media 450 and a second end of tape media 452. In some embodiments, each of the first beginning of tape media 440 and the first end of tape media 442 may be a physical boundary of the first tape media 400. In some embodiments, each of the first beginning of tape media 440 and first end of tape media 442 may be a virtual boundary of the tape media, such that each may be recognized by a computer system as a first or last longitudinal position where data may be stored on the first tape media 400. Similarly, in some embodiments, each of the second beginning of tape media 450 and second end of tape media 452 may be a physical boundary of the second tape media 401. In some embodiments, each of the second beginning of tape media 450 and second end of tape media 452 may be a virtual boundary of the tape media, such that each may be recognized by a computer system as a first or last longitudinal position where data may be stored on the second tape media 401. In some embodiments, the longitudinal distance between the first beginning of tape media 440 and the first end of tape media 442 may be identical or substantially similar (e.g., within 10 m) to the longitudinal distance between the second beginning of tape media 450 and the second end of tape media 452.

The first tape media 400 may include a first susceptible zone 458 that extends between a beginning longitudinal position 454 and an ending longitudinal position 456, relative to the first beginning of tape media 440. For example, the first susceptible zone 458 may extend between a beginning longitudinal position 454 that is 500 m from the first beginning of the tape media 440 and an ending longitudinal position 456 that is 700 m from the first beginning of the tape media 440. Similarly, the second tape media 401 may include a second susceptible zone 468 that extends between a beginning longitudinal position 474 and an ending longitudinal position 476, relative to the second beginning of tape media 450. In some embodiments, the distance between the first beginning of the tape media 440 and the beginning longitudinal position 454 may be identical or substantially similar to the distance between the second beginning of the tape media 450 and the beginning longitudinal position 474. Similarly, in some embodiments, the distance between the first beginning of the tape media 440 and the ending longitudinal position 456 may be identical or substantially similar to the distance between the second beginning of the tape media 450 and the ending longitudinal position 476.

In some embodiments, the beginning longitudinal position 454 and the ending longitudinal position 456 may correspond to the beginning longitudinal position 474 and the ending longitudinal position 476, such that a position and an extension of the first susceptible zone 458 corresponds to a position and an extension of the second susceptible zone 468. For example, in some embodiments, the distance between the first beginning of the tape media 440 and the beginning longitudinal position 454 may be a distance equivalent to half the distance between the first beginning of the tape media 440 and the first end of the tape media 442. Additionally, the distance between the first beginning of the tape media 440 and the ending longitudinal position 456 may be a distance equivalent to one fourth of the distance between the first beginning of the tape media 440 and the first end of the tape media 442. In this example, regardless of whether the distance between the second beginning of tape media 450 and the second end of tape media 452 is the same as the distance between the first beginning of the tape media 440 and the first end of the tape media 442, the beginning longitudinal position 474 may correspond to the beginning longitudinal position 454 in that each longitudinal position may be located a distance that is equivalent to half the distance between the respective beginning of tape media 440, 450 and the respective end of tape media 442, 452.

In some embodiments of the present disclosure, a block of data 419 may be stored in four adjacent segments (S1 402, S2 404, S3 406, and S4 408) in a first storage zone 417. The first storage zone 417 may be positioned in track one 411 of the first tape media 400. Additionally, the first storage zone 417 may be stored within the first susceptible zone 458.

A computer system according to an embodiment of the present disclosure may determine that first storage zone 417 is within susceptible zone 458, based on obtained storage zone information and obtained susceptible zone information. Additionally, the obtained storage zone information may indicate to the computer system that the block of data 419 is stored in the data sequence S1, S2, S3, S4. Based at least in part on the susceptible zone information and the first storage zone information, the computer system may store a duplicate block of data on the first tape media 400 and/or on second tape media 401 in a variety of configurations, such as the configurations described below.

For example, in some embodiments, the computer system may store a duplicate block of data 429 in a second storage zone 427 on the second tape media 401. In some embodiments, the computer system may designate a portion of the second tape media 401 as a non-storage zone 410. A non-storage zone may be a portion of tape media to which the storage of data is blocked. The position of the non-storage zone 410 on second tape media 401 may correspond to the position of first storage zone 417 on first tape media 400. By designating such a corresponding position, the computer system may ensure that the duplicate block of data 429 is stored differently (e.g., in a different position) when it is stored on the second tape media 401. For example, if the distance between the first beginning of the tape media 440 and the first end of the first storage zone 478 is 800 m, then a corresponding distance between the second beginning of the tape media 450 and the first end of the non-storage zone 480 may be 800 m. In another example, if the distance between the first beginning of the tape media 440 and the first end of the first storage zone 478 is equivalent to half the distance between the first beginning of the tape media 440 and the first end of the tape media 442, then a corresponding distance between the second beginning of the tape media 450 and the first end of the non-storage zone 480 may be a distance that is half the distance between the second beginning of the tape media 450 and the second end of the tape media 452. Accordingly, the computer system may ensure that between a first tape media and a second tape media, a duplicate block of data is not stored at a same numerical distance (e.g. 800 m) from a beginning of tape media, and the computer system may also ensure that a duplicate block of data is not stored at a same relative distance (e.g., half of the overall length of the tape media) from a beginning of tape media. In this way, regardless of whether a total length of the first tape media 400 and a total length of the second tape media 401 are identical, the computer system may prevent the second storage zone 427 from being subject to substantially similar forces as the first storage zone 417 as a result of the second storage zone 427 having a substantially similar relative position on the second tape media 401 as the first storage zone has on the first tape media 400.

In some embodiments, the first duplicate block of data 429 may be stored in segments S1 422, S2 424, S3 426, and S4 428. In some embodiments, the first duplicate block of data may be stored in a different data sequence (e.g., S4, S3, S2, S1) than the data sequence of the first block of data 419. In some embodiments, similar to the embodiments described regarding FIG. 3, a computer system may store a second duplicate block of data 439 in four segments (S1 412, S2 414, S3 416, and S4 418) in a third storage zone 437 on the first tape media 400.

Figure 5:
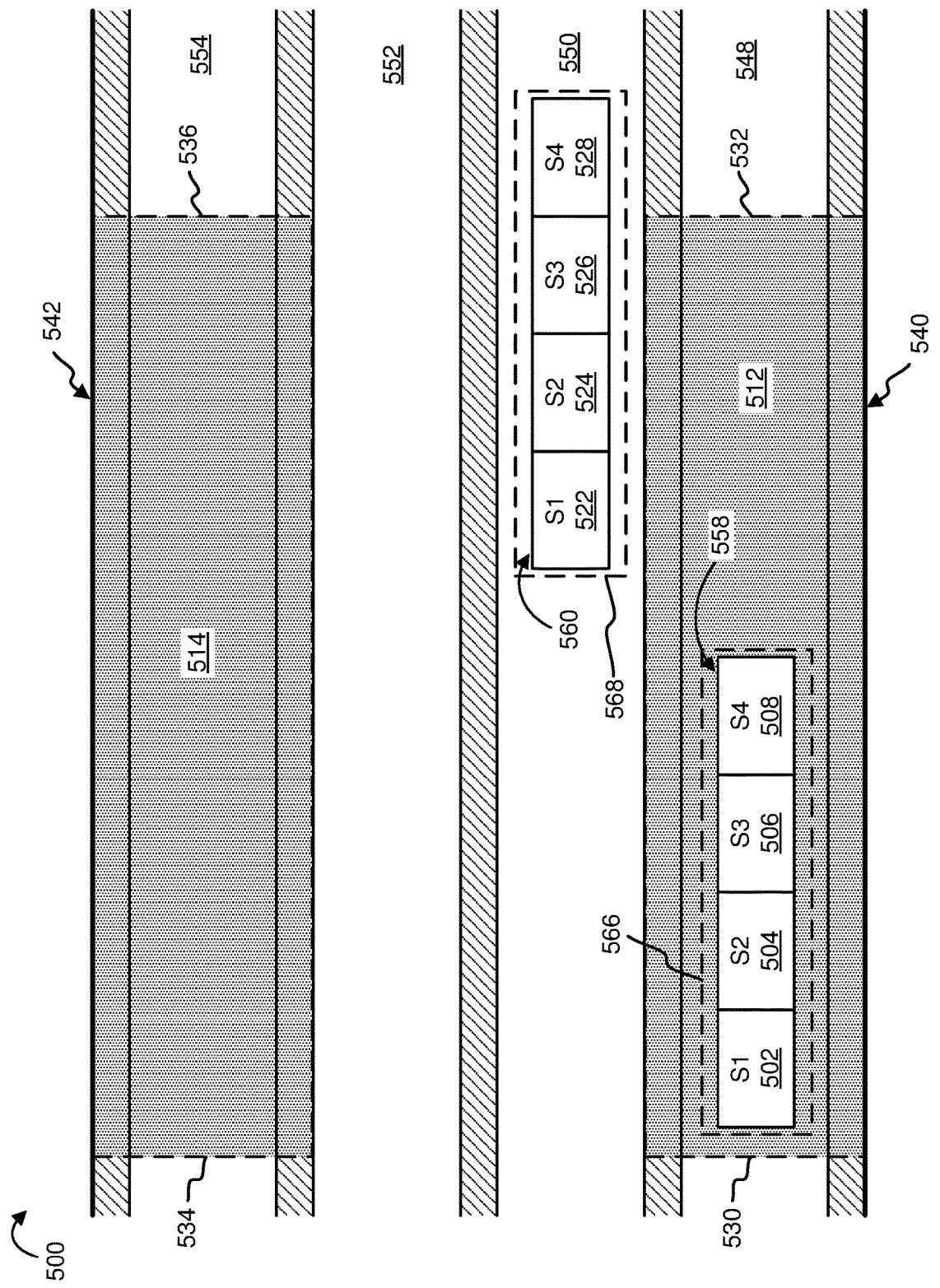
FIG. 5 depicts an example section of tape media having susceptible zones along its lateral edges, in accordance with embodiments of the present disclosure.

FIG. 5 illustrates an example section of tape media 500 having first and second susceptible zones 512, 514 along first and second lateral edges 540, 542, in accordance with embodiments of the present disclosure. In some embodiments, the first and second susceptible zones 512, 514 may each have a first side 530, 534 and a second side 532, 536. The first sides 530, 534 and the second sides 532, 536 may extend in transverse directions across one or more tracks of the tape media 500, based on forces that may be applied to the tape media 500. Similarly, the longitudinal positions of the first sides 530, 534 and the second sides 532, 536 may be based on forces that may be applied to the tape media 500. For example, in some embodiments, and ambient temperature may cause a thermal stress to be applied to the tape media 500. The thermal stress may subject the portions of the tape media 500 in the first and second susceptible zones 512, 514 to elongation that exceeds a threshold. Based on the tape geometry and the ambient temperature, the first and second susceptible zones 512, 514 may be determined to extend, respectively across the width of track one 548 and track four 554 of the tape media 500. Also, based on the tape geometry and the ambient temperature, the first sides 530, 534 of the first and second susceptible zones 512, 514 may have longitudinal positions that are a distance such as 800 m from a beginning of the tape media, and the second sides 532, 536 may have longitudinal positions that are a distance such as 100 m from the first sides 530, 534.

For simplicity, tape media 500 is illustrated as having four tracks: track one 548, track two 550, track three 552, and track four 554. In some embodiments, first block of data 558 may include four segments S1 502, S2 504, S3 506, and S4 508 and may be stored in a first storage zone 566. In some embodiments, the second of block of data 560 may include four segments S1 522, S2 524, S3 526, and S4 528 and may be stored in a second storage zone 568. In some embodiments, the second block of data 560 may be a duplicate block of data that may be stored in a variety of configurations, such as the configurations discussed with respect to FIGS. 3 and 4.

In some embodiments, a computer system according to an embodiment of the present disclosure may store a block of data outside of portions of the tape media 500 that have been determined to be susceptible zones. In this way, the computer system may store data on portions of the tape media 500 that are less likely to experience forces that may damage the block of data. For example, in some embodiments, the second block of data 560 may not be a duplicate block of data; rather, second block of data 560 may be a block of data that the computer system stores in the second storage zone 568 so that the second block of data 560 is not stored in a susceptible zone (e.g., first susceptible zone 512 and second susceptible zone 514). In this example, example, a computer system may obtain information (e.g., longitudinal position, length, and width) regarding first and second susceptible zones 512 and 514. Based on the obtained susceptible zone information, the computer system may select track two 550 as the location for the second storage zone 568 because that location is outside of the first and second susceptible zones 512 and 514. Accordingly, the computer system may store the second block of data 560 in the second storage zone 568 based on the obtained susceptible zone information.

Figure 6:
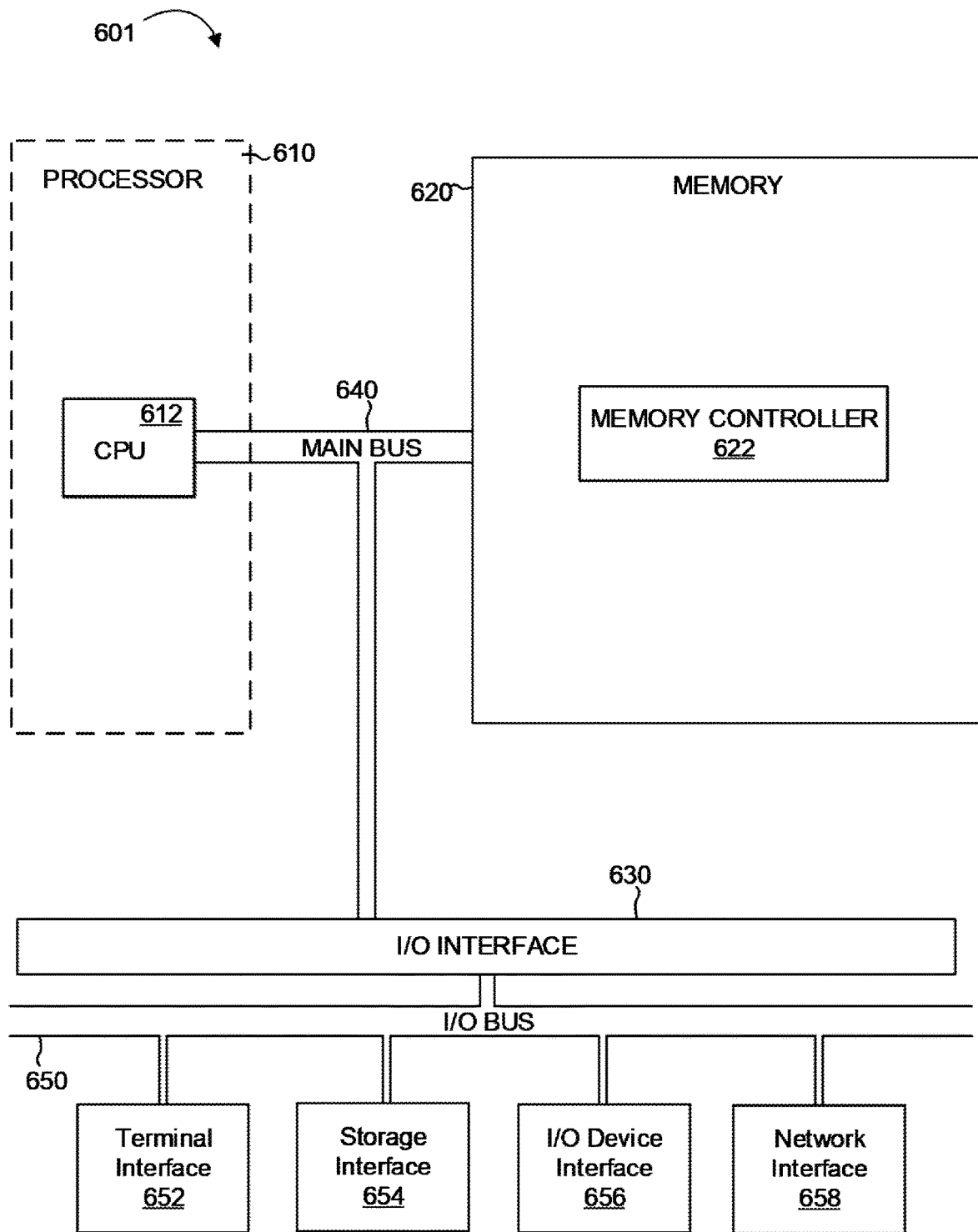
FIG. 6 depicts the representative major components of a computer system that may be used in accordance with embodiments of the present disclosure.

FIG. 6 depicts the representative major components of an exemplary Computer System 601 that may be used in accordance with embodiments of the present disclosure. The particular components depicted are presented for the purpose of example only and are not necessarily the only such variations. The Computer System 601 may comprise a Processor 610, Memory 620, an Input/Output Interface (also referred to herein as I/O or I/O Interface) 630, and a Main Bus 640. The Main Bus 640 may provide communication pathways for the other components of the Computer System 601. In some embodiments, the Main Bus 640 may connect to other components such as a specialized digital signal processor (not depicted).

The Processor 610 of the Computer System 601 may be comprised of one or more CPUs 612. The Processor 610 may additionally be comprised of one or more memory buffers or caches (not depicted) that provide temporary storage of instructions and data for the CPU 612. The CPU 612 may perform instructions on input provided from the caches or from the Memory 620 and output the result to caches or the Memory 620. The CPU 612 may be comprised of one or more circuits configured to perform one or methods consistent with embodiments of the present disclosure. In some embodiments, the Computer System 601 may contain multiple Processors 610 typical of a relatively large system. In other embodiments, however, the Computer System 601 may be a single processor with a singular CPU 612.

The Memory 620 of the Computer System 601 may be comprised of a Memory Controller 622 and one or more memory modules for temporarily or permanently storing data (not depicted). In some embodiments, the Memory 620 may comprise a random-access semiconductor memory, storage device, or storage medium (either volatile or non-volatile) for storing data and programs. The Memory Controller 622 may communicate with the Processor 610, facilitating storage and retrieval of information in the memory modules. The Memory Controller 622 may communicate with the I/O Interface 630, facilitating storage and retrieval of input or output in the memory modules. In some embodiments, the memory modules may be dual in-line memory modules.

The I/O Interface 630 may comprise an I/O Bus 650, a Terminal Interface 652, a Storage Interface 654, an I/O Device Interface 656, and a Network Interface 658. The I/O Interface 630 may connect the Main Bus 640 to the I/O Bus 650. The I/O Interface 630 may direct instructions and data from the Processor 610 and Memory 620 to the various interfaces of the I/O Bus 650. The I/O Interface 630 may also direct instructions and data from the various interfaces of the I/O Bus 650 to the Processor 610 and Memory 620. The various interfaces may comprise the Terminal Interface 652, the Storage Interface 654, the I/O Device Interface 656, and the Network Interface 658. In some embodiments, the various interfaces may comprise a subset of the aforementioned interfaces (e.g., an embedded computer system in an industrial application may not include the Terminal Interface 652 and the Storage Interface 654).

Logic modules throughout the Computer System 601—including but not limited to the Memory 620, the Processor 610, and the I/O Interface 630—may communicate failures and changes to one or more components to a hypervisor or operating system (not depicted). The hypervisor or the operating system may allocate the various resources available in the Computer System 601 and track the location of data in Memory 620 and of processes assigned to various CPUs 612. In embodiments that combine or rearrange elements, aspects of the logic modules' capabilities may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a magnetic hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    obtaining position information of a susceptible zone of a tape,
        wherein the susceptible zone is a section of the tape where a stress value of the tape exceeds a threshold;
    storing, based on the position information, a block of data to the tape in a first storage zone,
        wherein the first storage zone is positioned outside of the susceptible zone; and
    storing, based on the position information, a duplicate block of data to a second storage zone,
        wherein the second storage zone is positioned outside of the susceptible zone.

2. The computer-implemented method of claim 1, wherein the second storage zone is on the tape; and
    the computer-implemented method further comprising positioning the second storage zone beyond a threshold distance from the susceptible zone.

3. The computer-implemented method of claim 1, wherein
    storing the block of data to the tape comprises storing the block of data in a first data sequence,
    wherein storing the duplicate block of data to the second storage zone comprises storing, based on the block of data being stored in the first data sequence, the duplicate block of data in a second data sequence, and
        wherein the second data sequence comprises a reordered first data sequence.

4. The computer-implemented method of claim 1, further comprising a second tape; and
    wherein the second storage zone is on the second tape.

5. The computer-implemented method of claim 4, wherein the second tape has a second susceptible zone, and
 wherein the second storage zone is positioned outside of the second susceptible zone.

6. A computer program product, the computer program product comprising a computer readable storage medium having program instructions embodied therewith, the program instructions executable by a computer to cause the computer to:
 obtain position information of a susceptible zone of a tape,
  wherein the susceptible zone is a section of the tape where a stress value of the tape exceeds a threshold;
 store, based on the position information, a block of data to the tape in a first storage zone,
 wherein the first storage zone is positioned outside of the susceptible zone; and
 store, based on the position information, a duplicate block of data to a second storage zone,
 wherein the second storage zone is positioned outside of the susceptible zone.

7. The computer program product of claim 6, wherein the second storage zone is on the tape; and
 further comprising instructions to position the second storage zone beyond a threshold distance from the susceptible zone.

8. The computer program product of claim 6, wherein
 storing the block of data to the tape comprises storing the block of data in a first data sequence,
 wherein storing the duplicate block of data to the second storage zone comprises storing, based on the block of data being stored in the first data sequence, the duplicate block of data in a second data sequence, and
 wherein the second data sequence comprises a reordered first data sequence.

9. The computer program product of claim 6, further comprising a second tape; and
 wherein the second storage zone is on the second tape.

10. The computer program product of claim 9, wherein the second tape has a second susceptible zone, and
 wherein the second storage zone is positioned outside of the second susceptible zone.

11. A computer-implemented method comprising:
 obtaining position information of a susceptible zone of a tape,
  wherein the susceptible zone is a section of the tape where a stress value of the tape exceeds a threshold;
 storing, based on the position information, a block of data to the tape in a first storage zone,
  wherein the first storage zone is positioned outside of the susceptible zone; and
 positioning the first storage zone beyond a threshold distance from the susceptible zone.

* * * * *